United States Patent
Danicich et al.

(10) Patent No.: US 11,128,789 B2
(45) Date of Patent: Sep. 21, 2021

(54) FLUID RESISTANT LENS MOUNTS

(71) Applicant: Rosemount Aerospace Inc., Burnsville, MN (US)

(72) Inventors: Jeffrey P. Danicich, Savage, MN (US); Curtis Wicks, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/684,814

(22) Filed: Nov. 15, 2019

(65) Prior Publication Data
US 2021/0152715 A1    May 20, 2021

(51) Int. Cl.
| | | |
|---|---|---|
| H04N 5/225 | (2006.01) | |
| G02B 7/00 | (2021.01) | |
| H04N 5/232 | (2006.01) | |
| G03B 17/08 | (2021.01) | |

(52) U.S. Cl.
CPC ........... *H04N 5/2254* (2013.01); *G02B 7/003* (2013.01); *G03B 17/08* (2013.01); *H04N 5/2257* (2013.01); *H04N 5/23209* (2013.01)

(58) Field of Classification Search
CPC ..................................................... G03B 17/08
See application file for complete search history.

(56) References Cited

U.S. PATENT DOCUMENTS

| | | | |
|---|---|---|---|
| 2006/0126194 A1 | 6/2006 | Kazama | |
| 2008/0158678 A1* | 7/2008 | Costigan | G02B 7/04 |
| | | | 359/512 |
| 2009/0092385 A1* | 4/2009 | Cullen | G03B 17/08 |
| | | | 396/25 |
| 2017/0059805 A1 | 3/2017 | Ranetkins et al. | |
| 2017/0223245 A1* | 8/2017 | Park | G02B 7/04 |
| 2017/0371154 A1* | 12/2017 | Fedigan | G03B 17/08 |
| 2018/0224719 A1 | 8/2018 | Zhilinsky | |
| 2018/0352121 A1* | 12/2018 | Chapman | H04N 5/2252 |
| 2019/0268514 A1 | 8/2019 | Leonelli, Jr. | |

FOREIGN PATENT DOCUMENTS

| | | |
|---|---|---|
| CN | 207529084 U | 6/2018 |
| JP | 2002277945 A | 9/2002 |
| JP | 2017220824 A | 12/2017 |
| KR | 201004911 U | 5/2010 |
| WO | 2015089651 A1 | 6/2015 |

OTHER PUBLICATIONS

Extended European Search Report dated Mar. 9, 2021, issued during the prosecution of European Patent Application No. EP 20207156.9.

* cited by examiner

*Primary Examiner* — Twyler L Haskins
*Assistant Examiner* — Dwight Alex C Tejano
(74) *Attorney, Agent, or Firm* — Locke Lord LLP; Joshua L. Jones; Scott D. Wofsy

(57) ABSTRACT

A system includes a lens mount defining an inner bore that includes inward facing threads for engaging a lens component, with a lens opening at one end of the lens mount. The lens mount includes outward facing threads for engaging a camera housing. A first seal ring is included inside the inner bore for sealing against the lens component. A second seal ring is included on an outside of the lens mount for sealing against the camera housing.

15 Claims, 2 Drawing Sheets

FLUID RESISTANT LENS MOUNTS

SUMMARY

A system includes a lens mount defining first outward facing threads for engaging a camera housing and an inner bore that includes first inward facing threads, the inner bore extending through a lens opening at one end of the lens mount. A lens component includes second outward facing threads for engaging with the first inward facing threads of the lens mount. A first seal ring is sized and configured to seal to both the lens component and the lens mount. A second seal ring is sized and configured to seal to both the lens mount and the camera housing.

Each of the first seal ring and second seal ring can be an o-ring. The lens component can be threaded into the inward facing threads and sealed to the inner bore by the first seal ring to prevent ingress of moisture through the inward facing threads. The first seal ring can seat against an axial facing ledge that defines the lens opening, a radially inward facing surface of the inner bore, and an outward facing surface of the lens component. The outward facing surface of the lens component can be frustoconical.

The outward facing threads of the lens mount can be threaded into the camera housing. The second seal can seal between the lens mount and the camera housing to prevent ingress of moisture through the outward facing threads. The second seal ring can be seated in a channel that is set radially inward from an outward facing surface of the lens mount.

The outward facing threads can be defined in an outward extending flange of the lens mount. At least one axially extending set screw bore can extend through the flange for receiving a set screw to prevent relative rotation of the lens mount and camera housing.

A method includes threading a lens component into a lens mount and threading the lens mount into a camera housing, wherein the lens mount is threaded to a position that focuses the lens component on a sensor. The method can include engaging the lens mount to the camera housing with the lens component focused on the sensor using at least one set screw. The method can include sealing the lens component to the lens mount using a seal ring. The method can include sealing the lens mount to the camera housing using a seal ring.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
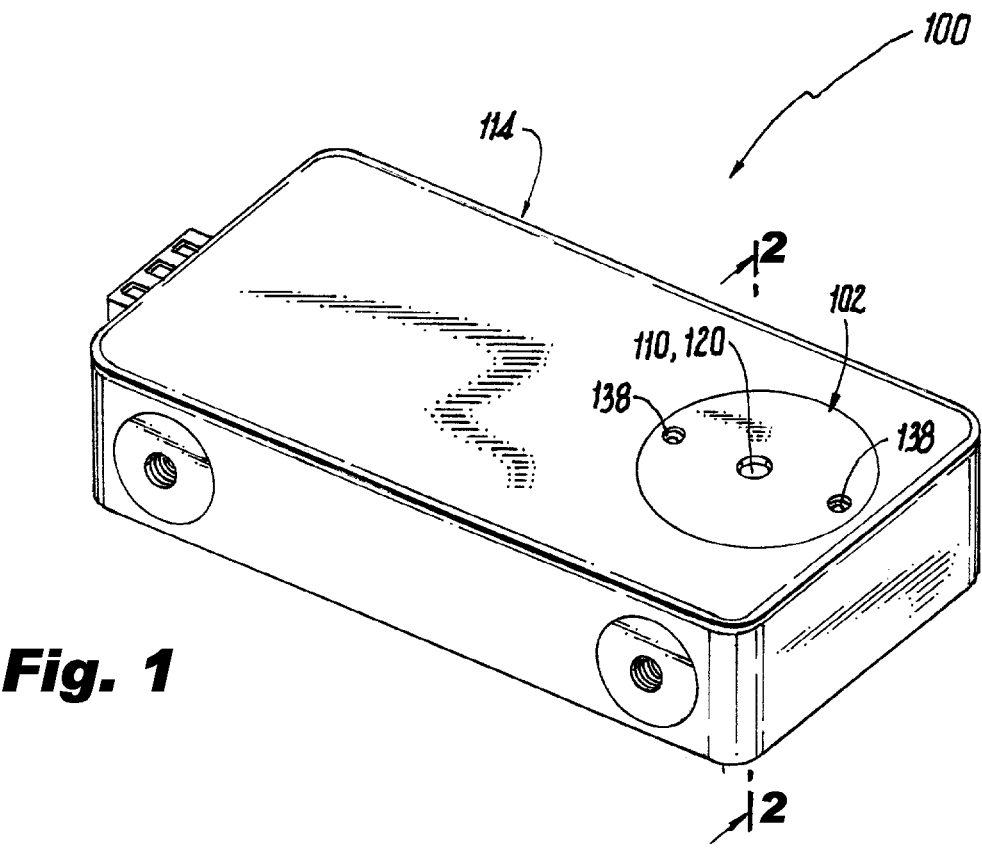
FIG. 1 is a schematic perspective view of an embodiment of a system constructed in accordance with the present disclosure, showing the camera housing and lens mount.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for sealing lenses in camera housings to prevent ingress of moisture, dust, and the like into the camera housings.

Figure 2:
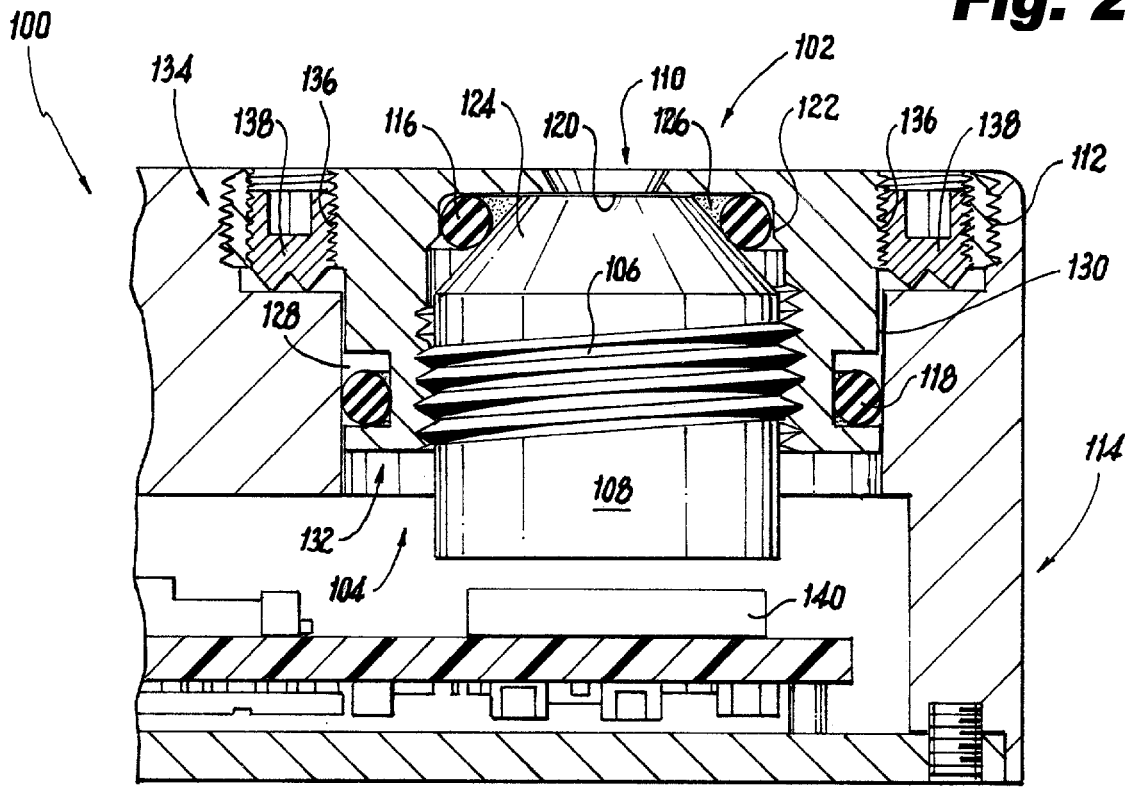
FIG. 2 is a cross-sectional side elevation view of the system of FIG. 1, showing the seal rings and threads.

Referring to FIGS. 1 and 2, the system 100 includes a lens mount 102 defining an inner bore 104 that includes inward facing threads 106 for engaging a lens component 108, e.g. an optical lens or assembly of optical lenses. There is a lens opening 110 at one end of the lens mount 102. While not shown, the lens opening can include a glass or sapphire window, or the like, e.g., if the lens component 108 is not itself sealed. The lens mount 102 includes outward facing threads 112 for engaging a camera housing 114. A first seal ring 116 is included inside the inner bore 104 for sealing against the lens component 108. A second seal ring 118 is included on an outside of the lens mount 102 for sealing against the camera housing 114. Each of the first seal ring 116 and second seal ring 118 is an o-ring. The lens component 108 is threaded into the inward facing threads 106 and sealed to the inner bore 104 by the first seal ring 116 to prevent ingress of moisture between the lens component 108 and lens mount 102 through the inward facing threads 106. The first seal ring 116 seats against an axial facing ledge 120 that defines the lens opening 110. The first seal ring 116 also seats against a radially inward facing surface 122 of the inner bore 104. The first seal ring 116 also seats against an outward facing surface 124 of the lens component 108. The outward facing surface 124 of the lens component 108 is frustoconical, so the first seal ring 116 is seated in an annular pocket 126 with a triangular shape in radial cross-sectional.

The outward facing threads 112 of the lens mount 102 are threaded into the camera housing 114. The second seal 118 seals between the lens mount 102 and the camera housing 114 to prevent ingress of moisture through the outward facing threads 112. The second seal ring 118 is seated in a channel 128 that is set radially inward from an outward facing surface 130 of the main barrel 132 of the lens mount 102. The outward facing threads 112 are defined in an outward extending flange 134 of the lens mount 102. A pair of axially extending set screw bores 136 extend through the flange 134, which each receive a respective set screw 138 to prevent relative rotation of the lens mount 102 and camera housing 114.

Figure 3:
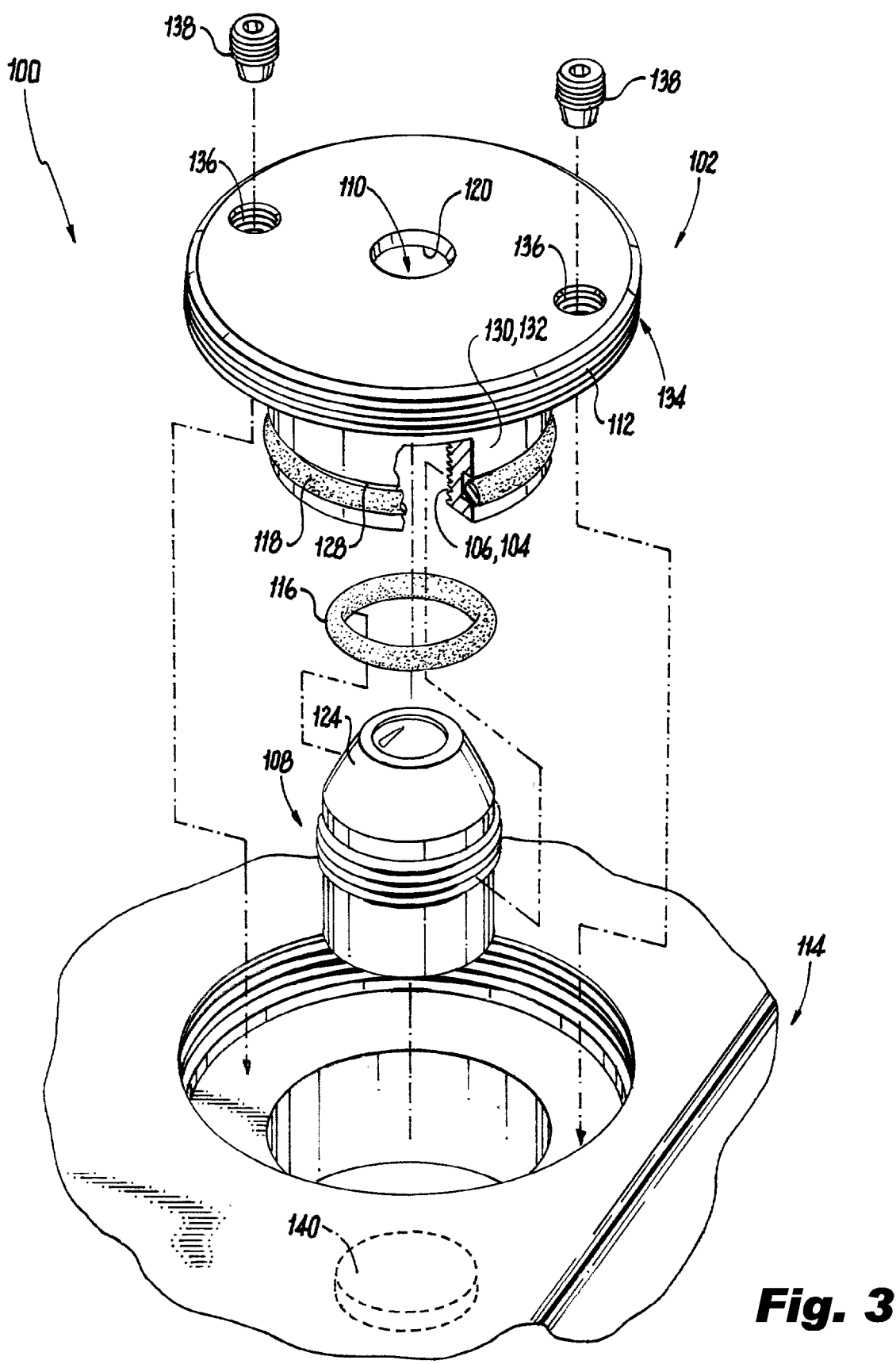
FIG. 3 is an exploded perspective view of the system of FIG. 1.

With reference now to FIG. 3, assembly of the system 100 includes threading the lens component 108 into the lens mount 102, thereby seating the first seal ring 116 in the position described above, and threading the lens mount 102 into the camera housing 114, thereby seating the second seal ring 118 in the position described above. The lens mount 102 is threaded in the camera housing 114 to a position that focuses the lens component 108 on a sensor 140, i.e. for forming focused images on the sensor 140 through the optical performance of the lens component 108. This focused position is set by engaging the set screws 138 through the set screw bores 136 and against the camera housing 114. It is also contemplated that in addition to or in lieu of set screws 138, a liquid lock tight can be used to set the position of the lens mount 102 in the camera housing 114. For example, if it is desirable in a given application to move the seal ring 118 to a position above or below the threads 112, e.g., to a position where the set screws 138 contact the housing 102 in FIG. 2, the set screws 138 and the set screw bores 136 can be omitted and liquid lock tight or another method of locking the threads 112 can be sued without departing from the scope of this disclosure. The result is that the lens component 108 is mounted in the camera housing 114 focused optics, a favorable form factor, and with sealed resistance against ingress of moisture, dust, and the like.

The methods and systems of the present disclosure, as described above and shown in the drawings, provide for sealing and setting lenses in camera housings with advantageous form factors and sealing relative to conventional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a lens mount defining first outward facing threads and an inner bore that includes first inward facing threads, the inner bore extending through a lens opening at one end of the lens mount;
   a lens component including second outward facing threads for engaging with the first inward facing threads of the lens mount;
   a first seal ring sized and configured to seal to both the lens component and the lens mount, wherein the first seal ring is radially inward from the first inward facing threads, and is at an axial position within the first outward facing threads, wherein radially inward is in a radial direction relative to the first inward facing threads and wherein the axial position is taken along an axial direction perpendicular to the radial direction; and
   a second seal ring sized and configured to seal to the lens mount, wherein the second seal ring is radially between the first outward facing threads and the first inward facing threads, and is at an axial position outward from the first inward facing threads, wherein radially inward is in the radial direction relative to the first inward facing threads and wherein the axial position is taken along the axial direction perpendicular to the radial direction.

2. The system as recited in claim 1, wherein the lens component is threaded into the inward facing threads and sealed to the inner bore by the first seal ring to prevent ingress of moisture through the inward facing threads.

3. The system as recited in claim 2, wherein the first seal ring seats against:
   an axial facing ledge that defines the lens opening;
   a radially inward facing surface of the inner bore; and
   an outward facing surface of the lens component.

4. The system as recited in claim 3, wherein the outward facing surface of the lens component is frustoconical.

5. The system as recited in claim 1, wherein the first seal ring seats against:
   an axial facing ledge that defines the lens opening; and
   a radially inward facing surface of the inner bore.

6. The system as recited in claim 1, further comprising a camera housing wherein the second seal ring seals to both the lens mount and to the camera housing.

7. The system as recited in claim 6, wherein the outward facing threads of the lens mount are threaded into the camera housing, and wherein the second seal seals between the lens mount and the camera housing to prevent ingress of moisture through the outward facing threads.

8. The system as recited in claim 7, wherein the outward facing threads are defined in an outward extending flange of the lens mount, and further comprising at least one axially extending set screw extending through the flange and into the camera housing to prevent relative rotation of the lens mount and camera housing.

9. The system as recited in claim 1, wherein the outward facing threads are defined in an outward extending flange of the lens mount, and further comprising at least one axially extending set screw bore extending through the flange for receiving a set screw to prevent relative rotation of the lens mount and camera housing.

10. The system as recited in claim 1, wherein the second seal ring is seated in a channel that is set radially inward from an outward facing surface of the lens mount.

11. The system as recited in claim 1, wherein each of the first seal ring and second seal ring is an o-ring.

12. A method comprising:
    threading a lens component into a lens mount; and
    threading the lens mount into a camera housing to a position that focuses the lens component on a sensor, wherein a first seal ring is sized and configured to seal to both the lens component and the lens mount, wherein the first seal ring is radially inward from the first inward facing threads, and is at an axial position within the first outward facing threads, wherein radially inward is in a radial direction relative to the first inward facing threads and wherein the axial position is taken along an axial direction perpendicular to the radial direction, and, wherein a second seal is ring sized and configured to seal to the lens mount, wherein the second seal ring is radially between the first outward facing threads and the first inward facing threads, and is at an axial position outward from the first inward facing threads, wherein radially inward is in the radial direction relative to the first inward facing threads and wherein the axial position is taken along the axial direction perpendicular to the radial direction.

13. The method as recited in claim 12, further comprising engaging the lens mount to the camera housing with the lens component focused on the sensor using at least one set screw.

14. The method as recited in claim 13, further comprising sealing the lens component to the lens mount using a seal ring.

15. The method as recited in claim 13, further comprising sealing the lens mount to the camera housing using a seal ring.

* * * * *